United States Patent [19]

Huemmer et al.

[11] 3,719,638

[45] March 6, 1973

[54] RADIATION CURABLE ACRYLIC URETHANE MONOMERS

[76] Inventors: Thomas F. Huemmer, 51967 U.S. Rt. 31, South Bend, Ind. 46637; Thomas J. Miranda, 16731 Brick Rd., Granger, Ind. 46350

[22] Filed: Oct. 29, 1969

[21] Appl. No.: 870,076

Related U.S. Application Data

[63] Continuation-in-part of Ser. No. 665,984, Sept. 7, 1967, abandoned.

[52] U.S. Cl. ...260/77.5 CR, 204/159.22, 260/18 TN, 260/77.5 AP, 260/77.5 MA, 260/859, 117/161 KP
[51] Int. Cl. ..........................C08g 22/16, C08d 1/00
[58] Field of Search..............260/77.5 CR, 77.5 AP, 260/77.5 MA, 859; 204/159.22

[56] References Cited

UNITED STATES PATENTS

| | | | |
|---|---|---|---|
| 3,509,234 | 4/1970 | Burlant et al. | 260/859 |
| 2,965,615 | 12/1960 | Tess | 260/77.5 |
| 3,448,171 | 6/1969 | Damusis | 260/859 |
| 3,297,745 | 1/1967 | Fekete et al. | 260/471 |
| 3,245,941 | 4/1966 | Mayer et al. | 260/31.6 |
| 3,455,857 | 7/1969 | Holzrichter | 260/22 |
| 3,553,174 | 1/1971 | Hausslein et al. | 260/77.5 |

*Primary Examiner*—James A. Seidleck
*Assistant Examiner*—H. S. Cockeram
*Attorney*—Merriam, Marshall, Shapiro & Klose

[57] ABSTRACT

A radiation curable composition is provided by reacting about one mole of an organic diisocyanate with about one mole of a hydroxyacrylate to form a monourethane adduct which is subsequently reacted with a styrene-allyl alcohol copolymer having a molecular weight between about 200 and 30,000, the reaction product being essentially free of unreacted isocyanate groups.

13 Claims, No Drawings

RADIATION CURABLE ACRYLIC URETHANE MONOMERS

This application is a continuation-in-part of copending application Ser. No. 665,984 filed Sept. 7, 1967, by Thomas J. Miranda and Thomas F. Huemmer, now abandoned.

This invention relates to novel and useful polymerizable compositions. More particularly, it is concerned with acrylic-urethane monomers formed by the reaction of polyisocyanates with hydroxy acrylates, which monomers are especially adapted for radiation curing.

The expanding technology of urethane-based polymers has given rise to a wide variety of urethane-based systems which have been used as flexible or rigid foams, coatings, binders, adhesives, rocket fuel binders and various other industrial applications. In order to use such urethane-based materials, it is necessary to cure them, preferably at room temperature. The time required for curing is necessarily important, particularly for coatings on various substrates which are produced in sufficiently high volume, that high production rates are necessary to compete economically. It is therefore desirable to utilize urethane systems which can be rapidly cured at room temperature. One system which has been used to obtain rapid curing involves the use of a high voltage electron beam radiation energy. Various types of such apparatus have been proposed such as radioactive materials, particle accelerators, and the like. Suitable sources are commercially available for industrial use. However, not all prior art urethane systems can be satisfactorily cured using radiation processes. It has been found that some prior art systems containing aromatic nuclei do not readily cure in radiation processing facilities.

In accordance with this invention, acrylic-urethane monomers can be made which can be readily cured at room temperature by high voltage electron beam radiation. In particular, it has been found that aromatic isocyanates can be used to produce easily curable coating systems which may be quickly and easily cured under the influence of electron beam radiation at room temperature. The acrylic urethane monomer so produced is a stable liquid monomer unit having a number of industrial applications.

The compounds of this invention may be used alone as monomers, or in combination with other monomers, or alternatively they may be used as modifiers or cross-linking agents for polymeric materials including various prepolymers.

Generally speaking, the compounds of this invention are produced from the reaction of a polyisocyanate with a hydroxy acrylate or methacrylate and a polyol. As a preferred mode of synthesis, the present invention broadly contemplates the production of a mono-urethane adduct by the reaction of about 1 mole of a hydroxy acrylate and with about 1 mole of a diisocyanate, so that the resulting adduct will have a reactive vinyl group and a reactive isocyanate group. The reactive vinyl group is sensitive to ionizing radiation whereas the reactive isocyanate group is capable of many chemical reactions with active hydrogen compounds thereby providing a convenient method of attaching radiation sensitivity cite to a multiplicity of compounds. Preferably the mono-urethane adduct is reacted with a polyol or other compound having a plurality of reactive hydrogen atoms, in order to react the available isocyanate of the mono-urethane adduct and produce a monomer having a plurality of vinyl groups which are sensitive to ionizing radiation. The resulting monomers are generally liquid and highly stable.

In the preferred practice of this invention, the hydroxyl function of the acrylic esters are first reacted with a polyisocyanate of the type similar to toluene diisocyanate. Those isocyanates which are suitable include the various isomers of toluene diisocyanate and mixtures thereof; as well as:
diphenyl methane diisocyanate
dimeryl diisocyanate
dichlorohexylmethane diisocyanate
metaxylene diisocyanate
phenylene diisocyanate
1,5-naphthalene diisocyanate
cumene-2,4-diisocyanate
4-methoxy-1,3-phenylene diisocyanate
4-chloro-1,3-phenylene diisocyanate
4-bromo-1,3-phenylene diisocyanate
4-ethoxy-1,3-phenylene diisocyanate
2,4′-diisocyanato diphenyl ether
5,6-dimethyl-1,3-phenylene diisocyanate
2,4-dimethyl-1,3-phenylene diisocyanate
4,4′-diisocyanato diphenyl ether
benzidine diisocyanate
4,6-dimethyl-1,3-phenylene diisocyanate
9,10-anthracene diisocyanate
4,4′-diisocyanato dibenzyl
3,3′-dimethyl-4,4′-diisocyanato diphenyl
2,4-diisocyanatostilbene
3,3′-dimethyl-4,4′-diisocyanato phenyl methane
3,3′-dimethoxy-4,4′-diisocyanato diphenyl
1,4-anthracene diisocyanate
2,5-fluorene diisocyanate
1,8-naphthalene diisocyanate
2,6-diisocyanato benzfuran
amyl benzene-2,4-diisocyanate
hexyl benzene-2,4-diisocyanate
dodecyl benzene-2,4-diisocyanate
butyl benzene-2,4-diisocyanate
polymethylene diisocyanates, such as tetramethylene diisocyanate pentamethylene diisocyanate hexamethylene diisocyanate
cycloalkylene diisocyanates, such as cyclohexylene-1,4-diisocyanate
hetero chain diisocyanates, such as $(O=C=NCH_2 CH_2)_2O$ In addition to the simple diisocyanates listed above, complex polyisocyanates containing intermediate urethane groupings may be used. Such materials may be made by reacting diisocyanates such as toluene diisocyanates with low molecular weight polyols such as trimethylol propane. For example, commercially available materials may be used such as CB-75, which is said to be the reaction product of 3 moles of toluene diisocyanate and 1 mole of trimethylol propane. In the practice of this embodiment of our invention diisocyanates such as diphenyl methane diisocyanate, metaxylene diisocyanate, hexamethylene diisocyanate, dichlorohexylmethane diisocyanate etc., may be reacted with polyols such as trimethylol propane, trimethylol ethane, glycerine, pentaerythritol, sorbitol and the like to produce useful complex polyisocyanates. Such polyisocyanates may be reacted with less than the stoichiometric requirement of hydroxy acrylate to produce a material having available NCO groups which may be used to react with a selected polyol, as described below. This approach increases the radiation sensitivity of the resulting product by increasing the density of the radiation sensitive sites at each reacting hydroxyl function of the polyol.

The acrylates suitable for use in this invention are selected from the hydroxy substituted acrylates having the following general formula:

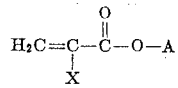

wherein X, the alpha substituate, comprises hydrogen, alkyl or aryl radicals as well as other groups such as chlorine, bromine and nitrile which will not deleteriously affect the curing of the finished composition, and wherein A represents an aliphatic or aromatic nucleus of the alcohol employed in forming the acrylate. Suitable examples of acrylates include:
 2-hydroxyethyl acrylate
 3-hydroxypropyl acrylate
 4-hydroxybutyl acrylate
 8-hydroxyoctyl acrylate
 12-hydroxydodecanyl acrylate
 2-hydroxy-3-chloropropyl acrylate
 2-hydroxy-3-acryloxypropyl acrylate
 2-hydroxy-3-methacryloxypropyl acrylate
 2-hydroxy-3-allyloxypropyl acrylate
 2-hydroxy-3-cinnamylpropyl acrylate
 2-hydroxy-3-phenoxypropyl acrylate
 2-hydroxy-3-(o-chlorophenoxy) propyl acrylate
 2-hydroxy-3-(p-chlorophenoxy) propyl acrylate
 2-hydroxy-3-(2,4-dichlorophenoxy) propyl acrylate
 2-hydroxy-3-acetoxypropyl acrylate
 2-hydroxy-3-propionoxypropyl acrylate
 2-hydroxy-3-chloroacetoxypropyl acrylate
 2-hydroxy-3-dichloroacetoxypropyl acrylate
 2-hydroxy-3-trichloroacetoxypropyl acrylate
 2-hydroxy-3-benzoxypropyl acrylate
 2-hydroxy-3-(o-chlorobenzoxy) propyl acrylate
 2-hydroxy-3-(p-chlorobenzoxy) propyl acrylate
 2-hydroxy-3-(2,4-dichlorobenzoxy) propyl acrylate
 2-hydroxy-3-(3,4-dichlorobenzoxy) propyl acrylate
 2-hydroxy-3-(2,4,6-trichlorophenoxy) propyl acrylate
 2-hydroxy-3-(2,4,5-trichlorophenoxy) propyl acrylate
 2-hydroxy-3-(o-chlorophenoxyacetoxy) propyl acrylate
 2-hydroxy-3-phenoxyacetoxypropyl acrylate
 2-hydroxy-3-(p-chlorophenoxyacetoxy) propyl acrylate
 2-hydroxy-3-(2,4-dichlorophenoxyacetoxy) propyl acrylate
 2-hydroxy-3-(2,4,5-trichlorophenoxyacetoxy) propyl acrylate
 2-hydroxy-3-crotonoxypropyl acrylate
 2-hydroxy-3-cinnamyloxypropyl acrylate In addition to the foregoing enumerated acrylates it will be apparent that the methacrylates, cinnamates, and crotonates are suitable in the present monomer preparations.

This invention further contemplates polyhydroxyacrylates of the type illustrated by the following structure:

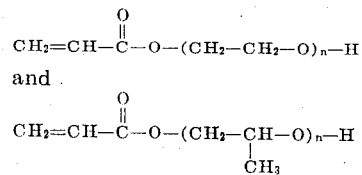

wherein $n$ varies between 1 and 12.

A wide variety of polyols may be used. Generally it is preferred that they contain at least 3 hydroxy groups per molecule. Because of the greater reaction speed, the polyols having the OH groups in primary position are preferred, but polyols containing secondary OH groups also may be used. To impart flexibility to compositions of this invention, flexible polyols may be used such as esters of ricinoleic acid, particularly castor oil and the polyhydric esters of hydroxy containing fatty acids and polyols selected from trimethylol ethane, trimethylol propane, pentaerythritol, dipentaerythritol, and sorbitol. Other suitable polyols include phosphorus derivatives of polyethylene and polypropylene oxides such as Pluracol 208 (Wyandotte Chemical Co.), or polyester polyether glycols such as Pluracol TP 440 (Wyandotte Chemical Co.).

Although the allyl group has been shown to be poorly responsive to radiation polymerization in the presence of air, allyl derivatives can be utilized through the process of this invention. Likewise, aromatic groups have been found to inhibit radiation curing of ethylenically unsaturated monomers, but the present invention makes possible the production of aromatic group containing monomers which may be radiation cured. This embodiment of the invention may be carried out by using a copolymer of allyl alcohol and styrene having a molecular weight of from about 200 to about 30,000, but copolymers having a molecular weight between about 450 and 2,000 are preferred. Such copolymers may be reacted with varying proportions of the mono urethane adduct via the reactive isocyanate function, thus providing an acrylate group which imparts radiation sensitivity to the resulting polymer structure. The amount of radiation sensitivity is proportional to the number of acrylate groups attached.

Throughout this specification, the term "acrylic urethane monomer" is used to refer to the radiation curable composition of the present invention. It is intended that that term should relate to the "reaction products" of the mono-urethane adduct and the styrene-allyl alcohol copolymers, as that term is defined in Example III. The term "reaction product" has been adopted for use in the claims appended hereto, and it is intended that the term "reaction product" is to be taken as synonymous to the term "acrylic urethane monomers," as used herein.

The acrylic urethane monomers of the present invention may be made by several methods. Although it is possible to first react a portion of the isocyanate compound with the polyol, followed by reacting the hydroxyacrylate, it has been found that the reaction between the higher molecular weight polyols and the isocyanates tends toward premature gelation and, in general is difficult to control. This method is more adaptable to reactions involving low molecular weight polyols. Hence, the preferred method is to first produce the mono-urethane adduct by reacting 2 equivalents of an appropriate polyisocyanate with about 1 equivalent of a suitable hydroxyacrylate. This reaction yields an intermediate compound which contains at least 1 acrylate group, at least 1 urethane group and at least 1 reactive isocyanate group. This intermediate compound, referred to herein as a "mono-urethane adduct," is then reacted with a suitable polyol, in approximately stoichiometric proportions, to produce acrylic urethane monomers which are essentially free of unreacted isocyanate groups.

The mono urethane adducts of this invention may be prepared by reacting the desired quantities of the hydroxyacrylates with the diisocyanates in the temperature range of from about 20° to about 120° C. However, temperatures below 90° C are generally preferred in order to obviate the possibility of side reactions and premature polymerization. Because of the effect of steric hindrance, it is preferred that the hydroxy group be located in the molecule to form a primary alcohol. Although secondary alcohols can be used, as indicated above, the secondary alcohols are much slower to react. The reaction between the diisocyanate and the hydroxy acrylate compound to form the urethane is exothermic and generally will require cooling in order to compensate for the heat generated. Undesired side reactions take place at higher temperatures which may alter the intended molecular structure and may also lead to early gelation.

The reaction of the mono-urethane adduct and the polyol may be carried out under the conditions described above, e.g., 20° C to 120° C. Similarly, the primary alcohol compounds react more easily than the compounds which are secondary alcohols, and corresponding adjustment to the reaction conditions must be made.

If the less preferred methods of synthesis are used, the same general reaction conditions may be used, although the lower temperature ranges should be more suitable in order to obviate the formation of gel.

These reactions are most desirably carried out in an inert atmosphere such as an atmosphere of nitrogen, argon, carbon dioxide or similar inert gases. These reactions may be conveniently carried out at atmospheric pressures, but higher pressures of up to 50 psig can be used if desired. No special equipment is required, since the reaction may be carried out in either glass lined or stainless steel reactors.

Generally it is desirable to carry out the urethane forming reactions in the presence of a solvent for the reactant. Generally the solvent must be non-functional, that is, the solvent must not contain free hydroxy, free carboxy or free amine groups which might interfere with the urethane forming reaction. This then limits the solvent to esters, ethers, hydrocarbons and similar solvents containing non-reactive, non-functional groups. Preferably, the solvent is of the reactive type, described below. If desired, catalysts can be used to promote the urethane reaction. Suitable catalysts include cobalt, tin, organotin compounds and alkali metal salts such as lithium ricinolete.

It has been found to be desirable under some circumstances to carry out the urethane forming reaction by dissolving the hydroxy acrylate in a monomeric solvent such as butoxyethyl acrylate prior to the addition of the isocyanate. In this way, a reaction medium is provided which is radiation sensitive and provides a 100 percent convertible coating vehicle. Other monomers may be used as the reaction medium provided they are radiation curable and that they are able to copolymerize with the acrylic urethane monomers of this invention, and are non-reactive during the addition of the isocyanate. Monomers suitable as reaction media include n-butyl acrylate, 2-ethoxyethyl acrylate, methoxyethyl acrylate, tetrahydrofurfuryl methacrylate, n-hexyl acrylate, n-heptyl acrylate, vinyl pyrrolidone and acrylic and methacrylic esters of polyfunctional polyols. Suitable polyfunctional esters include trimethylol propane trimethacrylate, diethylene glycol diacrylate, triethylene glycol diacrylate, allyl methacrylate, diallyl fumerate, 1,3-butylene glycol dimethacrylate, ethylene glycol dimethacrylate, polyethylene glycol diacrylate, and the like.

In order to avoid premature polymerization of the polymerizable materials of this invention, any small amount of the conventional polymerization inhibitor such as hydroquinone, methyl ether of hydroquinone, sulfur, thiourea and so forth may be incorporated either in the reaction mixture, prior to reaction, or to the finished product.

The following example will serve to illustrate the preparation of several acrylic-urethane monomers and the testing and use thereof, but it is understood that these examples are set forth merely for illustrative purposes and many other acrylic-urethane monomers are within the scope of the present invention.

EXAMPLE I

A 1 liter four neck flask equipped with a stirrer, condenser, thermometer, inert gas inlet and a dropping funnel was charged with 348 parts (2 moles) of 2,4-toluene diisocyanate. To this liquid 240 parts (2.07 moles) of 2-hydroxy ethyl acrylate was added by means of a dropping funnel while slowly agitating the mixture. After all the 2-hydroxy ethyl acrylate was added, stirring was continued for a period of approximately 2 hours. The reaction temperature was controlled between 23° C to 32° C with a water bath during this period. At the end of the reaction the percent isocyanate of the reaction mixture was determined and found to be 14.3 (theoretical 14.3 percent). The contents of the flask were then transferred to a dry cleaned container with same tightly closed. The product obtained is a clear, colorless, viscous liquid. Infrared analysis indicated the presence of NCO groups indicating that the preparation of the mono urethane adduct was essentially complete.

EXAMPLE II

Into a one-quart container was placed 220.5 grams (0.138 moles) of a styrene-allyl alcohol copolymer having a molecular weight of about 1,600, a hydroxyl content of from about 5.4 to about 6.0 percent and a specific gravity of about 1.083, along with 441 grams (3.06 moles) of 2-ethoxyethyl acrylate used as a reaction media. The container was sealed and tumbled on a ball mill for 2 days, afterwards a clear solution of the copolymer in monomer was obtained.

One hundred forty-seven parts of the mono urethane adduct described in Example I was added to a 1 liter flask equipped with a stirrer, condenser, thermometer, and addition funnel. After the addition of 1.0 grams of dibutyltin diacetate, 441 parts of the clear copolymer solution, described above, was added to the reaction mixture slowly over a 30 minute period by means of a dropping funnel. The mixture was then heated to 40° C for 2 hours and the isocyanate value was found to be 0.15 indicating that the reactive monomer was attached to the polymer chain. The flask was then cooled and the product was then transferred to a container which was tightly sealed. This product is believed to correspond to the structure indicated below:

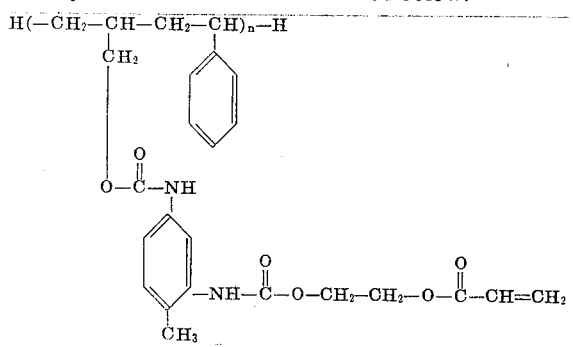

The composition of Example II was coated on four wood panels and four metal panels. A wood and metal panel were each cured at 1,2, 5 and 10 m rad to 1, 2, hard, solvent-resistant coatings, in spite of the high aromatic content of the coating.

The time required to cure the acrylic urethane monomers of this invention will depend upon the bulk of the composition as well as the intensity of the radiation source. In coatings, exposures of 0.1 to 10 seconds and generally exposures of about 1 second are generally sufficient using currently available radiation equipment. Electron beam radiators suitable for use in this invention, are commercially available. Van de Graaff type electron accelerators, linear accelerators or other sources producing gamma-type radiation can be employed. For a further discussion of electron beam radiation see "The Handbook of High Voltage Electron Beam Processing" 1959, published by High Voltage Engineering Corporation, Burlington, Massachusetts. It has been found that the polymerizable materials of this invention can be cured by using radiation dosages of ranging between 0.25 and 50 megarads. Usually a complete cure will be obtained between 1 and 10 megarads.

In the event it is desired to cure by non-radiation methods, the polymerization may be effected through the use of ultraviolet light or other actinic radiation, as well as by the use of conventional polymerization promoters such as peroxide or azo catalysts. Using these systems, the curable compositions of this invention may be polymerized in bulk, solution, emulsion, or suspension.

The acrylic urethane monomers of this invention are preferably used alone, in which case they may be irradiated and yield hard polymers. These monomers may be polymerized at low irradiation process such as 1 megarad or less, but advantageously the compositions of this invention may be used in amounts from 1 to about 50 percent in clear coating or pigmented finish in the presence of other polymerizable monomers or polymers. These combinations may be cured at dose rates of between 0.5 to about 50 megarads.

In the practice of this invention, the acrylic urethane monomers can be mixed with other monomers including styrene, alpha alkyl styrene, alkyl styrenes, vinyl naphthalene, alkyl acrylates, and alkyl methacrylates having up to eight carbon atoms in the alkyl group, vinyl pyrrolidone, and 2-sulfoethyl methacrylate. The products of this invention which are entirely acrylate terminated (no reactive isocyanate groups), may be mixed with other monomers containing polymerizable vinyl groups, such as those made from dibasic or polybasic acids reacted and vinyl cyclohexene monoxide or similar epoxides or the hydroxy acrylates and the hydroxy methacrylates.

The acrylic urethane monomers produced in accordance with this invention can be made into compositions which are suitable for use as primers, or topcoats on wood, paper, or plastic, such as nylon, polycarbonates, polyesters and polysulfones, ceiling tile or floor finishes or exterior wood, composition or aluminum and steel siding as well as galvanized and other types of metal.

The compositions thus produced advantageously may be used for encapsulating various electronic components. Through the use of higher doses of radiation, less heat is generated, which in turn, gives less heat distortion of the electronic components.

The monomers of this invention may be used alone or in combination with other monomers or polymers to impart such characteristics as the flexibility, adhesion, cross-linking, flow and leveling during application. The compositions of this invention may be blended with other polymers as desired. The resulting compositions may be applied by spraying, roll coating, dipping, curtain coating, and other conventional methods. Rigid and flexible foams can also be prepared using the compositions of this invention. In preparing foams, blowing agents are incorporated into the system to form the desired cellular structure.

A rad, as is recognized in the art, is defined as that amount of nuclear radiation which dissipates 100 ergs of energy per gram of tissue or $6.242 \times 10^{13}$ electron volts per gram in the process. It is approximately equal to the amount of energy that would be dissipated by one roentgen X-ray beam in a gram of tissue. A megarad or m rad is defined as 1 million rad.

All parts and percentages, as used herein are in terms of weight, unless expressly stated otherwise. All temperatures are in centigrade.

Although this invention has been described with relation to illustrative embodiments, the scope of this invention is not so limited. Those skilled in the art to which this invention pertains, can utilize these teachings to derive alternative equivalents without departing from the scope or spirit of the invention, as defined by the following claims:

We claim:

1. An acrylic urethane reaction product which is stable at room temperature and curable by electron beam radiation to yield a solvent-resistant solid polymer comprising the reaction product of one hydroxy equivalent of a styrene-allyl alcohol copolymer having a molecular weight of from about 200 to about 30,000 and up to one mole of a mono-urethane adduct formed by reacting at least one mole of a hydroxy acrylate, and about one mole of an organic diisocyanate, said reaction product being essentially free of unreacted isocyanate groups.

2. A reaction product in accordance with claim 1, in which the diisocyanate is an aromatic diisocyanate.

3. A reaction product in accordance with claim 2, wherein the diisocyanate is toluene diisocyanate.

4. A reaction product in accordance with claim 1, wherein the hydroxy acrylate is selected from the group consisting of hydroxyalkyl acrylates and hydroxyalkyl methacrylates, wherein the alkyl group contains at least two, but not more than six carbon atoms.

5. A reaction product in accordance with claim 4, wherein the hydroxyacrylate contains a primary hydroxyl group.

6. A reaction product in accordance with claim 1, wherein the isocyanate contains intermediate urethane groups, and is the isocyanate terminated reaction product of a diisocyanate and a hydroxy containing organic compound.

7. A reaction product in accordance with claim 1, wherein said copolymer contains at least 3 hydroxy groups per molecule.

8. A reaction product in accordance with claim 1, formed by the reaction of about 1 mole of hydroxyethyl acrylate, one mole of toluene diisocyanate and one hydroxy equivalent of said styrene-allyl alcohol copolymer.

9. A method of preparing an acrylic urethane reaction product which is stable at room temperature and curable by electron beam radiation to yield a solvent-resistant solid polymer, comprising as a first step reacting approximately equimolar quantities of a hydroxy acrylate and an organic diisocyanate, and a second step, reacting the product of the first step with a styrene-allyl alcohol copolymer having a molecular weight of from about 200 to about 30,000, the quantity of said copolymer being sufficient to react with essentially all free isocyanate groups.

10. A method as described in claim 9, wherein the second step is carried out in a polymerizable solvent.

11. A method as described in claim 9, wherein said hydroxy acrylate is selected from the group consisting of hydroxyalkyl acrylates and hydroxyalkyl methacrylates, wherein the alkyl group contains at least two, but no more than six carbon atoms.

12. A method as described in claim 11, wherein said hydroxy acrylate is hydroxyethyl acrylate.

13. A method as described in claim 9, wherein said diisocyanate is toluene diisocyanate.

* * * * *